United States Patent [19]

Buell

[11] 4,365,433

[45] Dec. 28, 1982

[54] NAUTICAL CHART CASE

[76] Inventor: Calvin D. Buell, 1077 Holly Spring La., Grand Blanc, Mich. 48439

[21] Appl. No.: 278,734

[22] Filed: Jun. 29, 1981

[51] Int. Cl.³ .............................................. B42F 17/22
[52] U.S. Cl. ....................................... 40/391; 40/534; 40/124.2; 40/159
[58] Field of Search .................... 150/39, 52; 206/466; 40/391, 124.2, 124, 405, 534

[56] References Cited

U.S. PATENT DOCUMENTS

| | | | |
|---|---|---|---|
| 2,238,332 | 4/1941 | Lyman | 150/39 |
| 2,272,623 | 2/1942 | Runner | 206/466 |
| 2,650,594 | 9/1953 | Heilman | 40/405 |
| 2,725,913 | 12/1955 | Horwin | 150/39 |
| 3,363,349 | 1/1968 | Nelson | 40/391 |
| 3,748,768 | 7/1973 | Strowger | 40/124.2 |
| 4,214,661 | 7/1980 | Turetzky | 206/466 |
| 4,241,527 | 12/1980 | Becker | 40/124.2 |

Primary Examiner—Gene Mancene
Assistant Examiner—Wenceslao J. Contreras
Attorney, Agent, or Firm—Harry R. Dumont

[57] ABSTRACT

A waterproof chart case for retaining a plurality of separate charts in chosen sequence inside a roll-up cover. The separate charts are individually contained in waterproof holders which are in hinged, stacked relationship one relative to the other on the inner side of the cover. A separate closure means is used to retain each of the chart holders in place.

7 Claims, 3 Drawing Figures

NAUTICAL CHART CASE

BACKGROUND OF THE INVENTION

The present invention relates to a case for holding a number of charts in a ready reference position. In a typical prolonged trip, the boat operator will have to refer to a number of charts in sequence. It is exceedingly difficult to handle the charts one by one and to store them in a moisture proof condition. It is important that they be jacketed against exposure to water and other liquids during the trip as well as during their use. The transparent holder for each chart makes it possible to mark the route with a grease pen right on the holder.

It will be understood that the present invention is suitable for use in aircraft, military vehicles or even for construction blueprints.

A number of prior art solutions to the problem are known. For example in U.S. Pat. No. D. 153,332 issued on Apr. 12, 1949 to R. H. Armstrong for "Chart Housing", there is shown a rolled up or scroll type arrangement for holding charts. This system is not appropriate where more than one chart has to be referred to. Nor does it provide the necessary waterproof storage for the charts.

A further approach is shown in U.S. Pat. No. 1,471,481 issued on Oct. 23, 1923 to P. P. Gobberdiel, for "Tourist's Guide". That patent shows a plurality of rigid frames for holding individual travel sheets or similar data. The individual frames however are not readily removable for reference nor for placement one relative to the other in a sequential arrangement.

U.S. Pat. No. 3,807,071 issued on Apr. 30, 1974 to J. T. Candor for "Frame Construction For a Plural Page Document". This patent shows a carrier for a number of documents which are pivotally held at their upper ends to provide fanning out for reference to the individual sheets. It does not however show a system in which the individual sheets are readily removable for reference and for sequential line-up, one relative to the other.

SUMMARY OF THE PRESENT INVENTION

The present invention it will be seen to deal with a nautical chart case with individual chart holders which makes their storage and handling convenient and safe on a boat. It further includes a cover of the roll-up type with a simple yet effective means for storing the charts in a waterproof and safe condition. The invention is suitable for use in a number of environments such as aircraft, military vehicle and the like.

During the use of the charts, they can be fanned out for separate viewing or individually taken out by a closure means such as a zipper and then placed end to end or side by side or however their combined use may be most convenient.

In addition, each of the chart holders has a transparent cover to protect the charts while in use from being exposed to spots, stains or other damage.

BRIEF DESCRIPTION OF THE DRAWINGS

The present invention will now be described with reference to the accompanying specification and to the drawings in which like numerals refer to like parts and in which.

DETAILED DESCRIPTION OF THE PREFERRED EMBODIMENT

Figure 1:
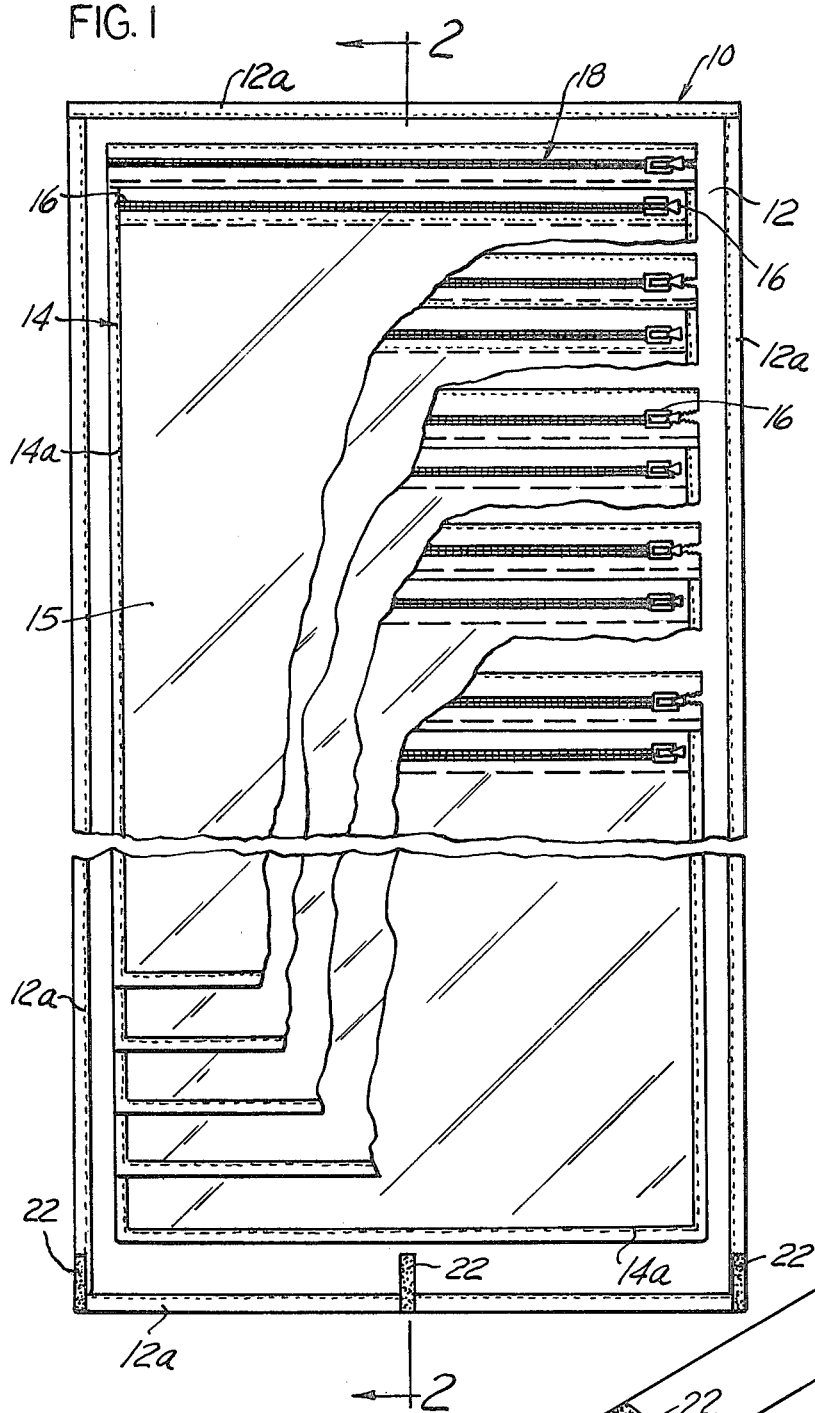
FIG. 1 shows the chart case with parts broken away to illustrate it in an opened position.

FIG. 1 shows the assembly of charts inside the chart case. The case is indicated generally by the numeral 10. It includes an outer cover 12. The outer cover 12 may be formed of a soft material such as naugehyde or the like. It includes marginal portions 12a to add to the strength and durability of the cover. Mounted inside the cover 12 in hinged, stacked relationship are a plurality of chart frames or holders 14. Each chart holder 14 includes a border stitched portion 14a and a viewing envelope 15 preferably formed of a transparent and freely flexible material such as vinyl. In this matter, each individual chart holder 14 protects its respective chart 13 from water damage from top, bottom or edge.

Figure 2:
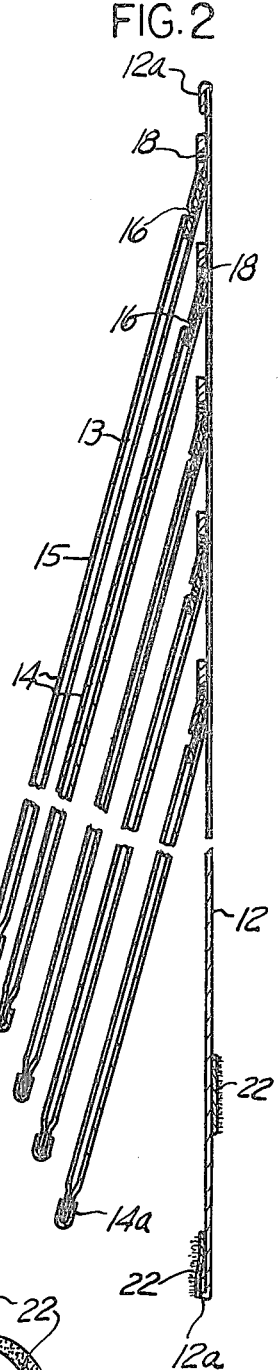
FIG. 2 is a side elevational view of the case showing the individual chart holders.

At the upper end of each holder 14, there is included a non-separating closure device 16 preferably of the zipper type. This permits easy changeover of charts within the individual chart frames or holders 14. Normally charts will be preselected before a trip and mounted in the sequence top to bottom in which they would be referred to on the voyage. In some cases where there is a cross over from one chart to the other it is advantageous to place the charts end to end to watch the transition point. This is facilitated by inclusion in connection with each holder 14 of an upper separating closure means 18. In the present instance, this is shown as a separating zipper but it would be understood that my invention is not limited to this particular type of device. As shown in FIG. 2, the individual holders 14 can be fanned out one from the other for ready reference. Otherwise, they can be individually zipped out and the end to end placement above referred to can be made.

Figure 3:
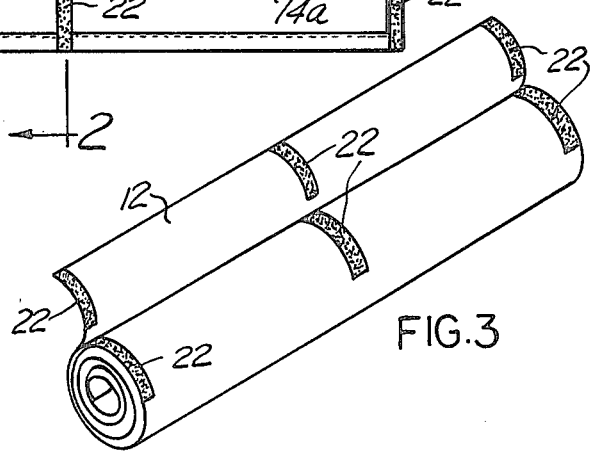
FIG. 3 is a perspective view of the chart case just preparatory to its being placed in a closed position.

Also shown on opposed side of the cover 12 there are three pair of fastener devices of the ready separable type commercially know as Velcro. These are identified by the numeral 22. With the cover 12 rolled-up position as shown in FIG. 3, the respective Velcro fasteners 22 are opposed one to the other and by simply applying pressure it is possible to lock the chart case and place it in a tight and convenient storage condition.

It will thus be seen that I have provided by my invention a novel and improved nautical chart case that is suitable for use and for storage on a boat in a manner not possible with prior art cases. It is further suitable for use in aircraft, military vehicles or the like.

I claim:

1. A chart case for holding a plurality of separate charts, comprising:
   a flexible cover;
   a plurality of chart holders having transparent front portions and mounted on the inner side of said cover, each of said holders having a zipper type closure and opening means proximate one edge thereof;
   means including a separate zipper for securing said holders to said cover in hinged, stacked relationship one relative to the other; and
   means fixed to said cover for closing and retaining it in a closed roll-up position.

2. The combination as set forth in claim 1 wherein said means for securing said holders to said cover in each case comprises a separating type zipper fastener device.

3. The combination as set forth in claim 1 wherein each of said holders includes a closure and opening means mounted proximate one edge thereof for inserting a chart in its respective holder.

4. The combination as set forth in claim 1 wherein said cover is of the naugehyde type.

5. The combination as set forth in claim 1 wherein said cover includes about its periphery a stitched marginal portion for reinforcing it.

6. The combination as set forth in claim 1 wherein said means for closing said cover and holding it securely in its closed condition comprises a plurality of opposed velcro bands mounted on said cover.

7. The combination as set forth in claim 1 wherein said holders each further include a back transparent portion.

* * * * *